| United States Patent | [15] 3,656,901 |
|---|---|
| Kummerle | [45] Apr. 18, 1972 |

[54] METHOD OF MAKING SILICA PARTICLES

[72] Inventor: Herman Fred Kummerle, Toledo, Ohio
[73] Assignee: Owens-Illinois, Inc.
[22] Filed: Aug. 30, 1967
[21] Appl. No.: 664,246

[52] U.S. Cl. ..............................................23/182, 252/448
[51] Int. Cl. ....................................C01b 33/16, B01j 11/44
[58] Field of Search .............................23/110; 252/448, 451

[56] References Cited

UNITED STATES PATENTS

| 2,552,323 | 5/1951 | Kimberlin | 252/448 |
| 2,450,394 | 9/1948 | Brown et al. | 252/448 |
| 3,296,122 | 12/1966 | Clinton et al. | 252/317 X |

Primary Examiner—Oscar R. Vertiz
Assistant Examiner—G. O. Peters
Attorney—W. A. Schaich and D. K. Wedding

[57] ABSTRACT

Silica particles, e.g., in bead form, are prepared from an alkali-metal (preferably sodium) silicate in an aqueous-organic reaction medium at ambient (preferably) or higher temperature and at a pH within the range of from 4.5 to 10. The organic (preferably recoverable organic) medium is critical and has a specifically defined bead-making capability. It provides a dispersed phase in which a silica "hydrosol" derived from an alkali-metal silicate is soluble and wherein it can polymerize to yield gelled particles of silica.

Examples of operative organic media are n-hexylamine, 2-ethylhexylamine, 2-methyl-5-ethylpyridine, n-hexyl Carbitol and n-hexyl Cellosolve. Organic media found to be inoperative are 2-methyl-1-pentanol, 1-hexanol, 5-ethylbutanol and n-butanol.

Descriptions are given of the two different types of silica products that are obtained; also, details of operating conditions and factors that influence the type of silica particles that result.

The silica products are useful as, for example, catalysts and catalyst supports, and in other applications wherein silica in particulate form is employed.

16 Claims, No Drawings

METHOD OF MAKING SILICA PARTICLES

THE INVENTION

This invention relates broadly to the art of making silica particles. More particularly it is concerned with a method of forming small particles, including beads and bead-like particles as well as irregularly shaped particles or agglomerates thereof, from water-soluble alkali-metal silicates, specifically sodium silicate (water-glass).

Compounds of the formula $xNa_2O \cdot ySiO_2$ are named by the rules of the International Union of Pure and Applied Chemistry as sodium ($x:y$) silicates. The profound effects of traces of oxides of polyvalent metals makes it difficult to define exactly the ratios of $x:y$ that are present in the water-soluble silicates. However, it is generally believed that a value of $x/y$ greater than 0.24 characterizes the water-soluble sodium silicates, and that a similar generalization holds for the commercially less important silicates of potassium, lithium, rubidium and cesium. The soluble sodium silicates have been used commercially for many different purposes and in many different applications including, for example, detergents; adhesives; in cements, sizes and coatings; in various material-treating applications such as in the treatment of water, textiles, concrete, etc.; in oil-well drilling compositions and applications; in the manufacture of roofing granules; and for various other purposes and applications.

Silica beads have found applications as catalysts or catalyst supports in fixed, moving or fluidized bed systems for hydrocarbon conversion in the petroleum industry. Consequently, methods have been provided for the preparation of silica beads from water-soluble silicates. The processes usually involve the preparation of a suspension of acidified, aqueous sodium silicate in a water-immiscible medium such as a liquid hydrocarbon. The resulting suspension is maintained until the spheres have hardened, after which they are separated from the liquid medium in which they have been formed, sorted and washed free of undesirable contaminants.

An improvement in prior processes of forming uniformly small, solid, spherical beads from alkali-metal silicates, specifically sodium silicate, is disclosed in U.S. Pat. No. 3,258,311, dated June 28, 1966, of Alfred J. Burzynski and Robert E. Martin, the assignee thereof being formerly the name of the corporation to which the instant invention is assigned.

In my copending application Ser. No. 587,647, filed Oct. 19, 1966, now U.S. Pat. No. 3,489,516 and assigned to the same assignee as the present invention, I have disclosed and claimed a process for making silica particles from alkali-metal silicates that involves the use of excess acid and by which is meant "acid, other than the silica acid that is present, which is over and above that which is equivalent to the value of $Na_2O$ in the sodium silicate feed." The aforesaid process further involves the use of certain organic liquid reaction media, e.g., n-hexyl Cellosolve (ethylene glycol mono-n-hexyl ether), that can be caused to provide a dispersed phase in which the silicic acid is soluble and wherein it can polymerize and/or continue to polymerize to assume the shape of the dispersed phase. Optionally, a fluoride ion derived from, for example, sodium fluosilicate is included in the reaction mixture as a polymerization catalyst. When certain liquid reaction media are used in this process, e.g., isopropanol, the desired solubility properties of the said media are achieved by salting out the aqueous phase.

The present invention is an improvement in the process set forth in my aforementioned copending application.

In the method of the present invention, as in that set forth in my above-identified application, the dispersed phase and the phase in which silica bead formation takes place is the essentially organic phase. In marked contrast, in the prior art techniques the dispersed phase and the phase in which bead formation occurs is the essentially aqueous phase. Typical of the prior art wherein gelation of a hydrosol is effected at an approximately neutral pH is U.S. Pat. No. 2,385,217 which discloses (cf., Example 1) gelation times of from 10 to 20 seconds in making silica alumina beads at a pH of 6.9. In this process globules of colloidal silica alumina solution fall through a water-immiscible solvent, e.g., chlorobenzene or a mineral oil such as gas oil, and are gelled before passing into a layer of water located beneath the organic solvent.

It is a primary object of the present invention to simplify processing and to improve the economics of producing silica particles using a water-soluble alkali-metal silicate (or mixtures thereof), and specifically water-soluble sodium silicate, as a starting material. The invention provides an improved process of making such particles in spherical or approximately spherical form (including bead or bead-like particles as well as irregularly shaped particles or agglomerates thereof).

Other objects of the invention will be apparent to those skilled in the art from the following more detailed description and from the appended claims.

The objects of the invention are attained by a combination of at least two different important and critical factors in the production of silica particles from an alkali-metal silicate such as sodium silicate.

One requirement is that the silica polymerization be effected under closely controlled pH conditions that are neither too acidic nor too basic, and by which is meant specifically a pH within the range of from 4.5 to 10.0. From a practical standpoint in this type of reaction, those skilled in the art sometimes designate any pH within this range as being "approximately neutral."

Although the pH range is quite critical to the rate of silicic acid polymerization and occurs in the pH range of from 4.5 to 10.5 [cf., R.K. Iler, "The Colloid Chemistry of Silica and Silicates," pp. 47–48, Cornell University Press (1955)], it is difficult to measure pH accurately during the polymerization reaction. If a glass electrode system is used for pH measurements, as was done in carrying out much of the work leading to the present invention, the polymerizing silicic acid tends to coat the electrode surface and, therefore, blocks the pores of the electrode. It is expected that such blockage changes the ion diffusion measurement and yields positive errors, i.e., pH readings that are higher than the actual pH. An alternative method of measurement is the use of pH paper or color indicators.

In the present investigation it was found that the pH range for bead production using pH paper and color indicators coincided more closely with the maximum rate of gelling of silica gels reported by Iler, supra, than that using potentiometric methods. Iler reports the maximum rate as taking place between pH 5 and pH 8.

The other requirement in producing silica particles from an alkali-metal silicate in accordance with the present invention is that there should be used at least one of a certain class of organic materials capable of providing a dispersed phase of minute globules in which the silicic acid is soluble and in which globules, or both within and on their outer surfaces, the silicic acid can polymerize and/or continue to polymerize to assume the shape of the dispersed phase. Examples of such organic materials (i.e., liquid reaction media) are n-hexyl Carbitol (diethylene glycol mono-n-hexyl ether), n-hexyl Cellosolve, 2-methyl-5-ethylpyridine, n-hexylamine, 2-ethyl-hexylamine and Alkyl Pyridine HB (available from Union Carbide Chemicals Company, New York, N. Y.), and equivalent organic materials in the particular relationship employed in this invention. Alkyl Pyridine HB is a mixture of different substituted pyridines with a reported equivalent weight of 170 and a specific gravity, 20/20° C., of 1.0105.

Such liquid organic compounds as those described above are believed to be operative in carrying this invention into effect because of the relatively high solubility of water in them and the solubility, which can be only very slight, of the organic compound in water. (For example, it has been found that 2-methyl-5-ethylpyridine is operable although it shows solubility in water at about 25° C., in the standard bead-making procedure hereafter described, of less than 0.05 percent by weight, i.e., the organic content of the aqueous phase is less than the instrumental detectability limit.) Concurrent influencing factors are believed to be a possible (and, in all likelihood, probable) solubility relationship between the inorganic hydrosol (specifically silica hydrosol) that is initially formed, and the aforesaid liquid organic compound constituting the dispersed phase.

In other words, it is not merely a matter of the water being relatively highly soluble in the organic phase but also a matter of the organic compound having at least slight solubility in the aqueous phase. The following is intended to illustrate this point.

An aqueous sodium silicate solution containing 1.74% $Na_2O$ and 5.80% $SiO_2$ was prepared. After extended and intimate contact, at room temperature, of separate portions of this sodium silicate solution with equal volumes of each of three different compounds, liquid compositions were obtained having the characteristics shown in Table I.

TABLE I

| Organic Compound | Organic Compound in Aqueous Phase, % by Weight | Water in Organic Phase, % by Weight |
|---|---|---|
| n-Hexyl Cellosolve | 0.64 | 13.0 |
| n-Hexyl Carbitol | 0.91 | 26.9 |
| n-Butanol | 5.61 | 12.7 |

From a consideration of the tabulated data with respect to the percentage of water in the organic phase, it is seen that both n-hexyl Cellosolve and n-butanol have approximately the same solubility characteristics. However, considering these same compounds from the standpoint of their solubility in the aqueous phase, it will be noted that n-butanol is nearly nine times more soluble. n-Hexyl Cellosolve is operative in practicing the present invention; but when the same technique with n-butanol as the organic phase is employed, including the use of the same approximately neutral pH conditions, it is not possible to produce a gel in the organic phase only.

The chosen organic material that furnishes the dispersed phase influences the type of particulate silica material that is obtained as the final product, and which may be designated as category $a$ and category $b$. The category $a$ product is represented by those silica particles having the most desirable mechanical properties, i.e., they are hard, abrasion-resistant beads. The silica particles, resulting from processing the organic phase gel material that is obtained when certain liquid organic materials are employed as the dispersion medium, are herein designated as a category $b$ product. These two different types of products will be further discussed later herein.

The category of the beads that result from the use of different liquid organic reaction media (both operative and inoperative species), together with indices of their relative bead-making ability, are shown in Table II.

The test method by which the data and bead category classification are obtained comprises contacting, at room temperature (about 25° C.), the organic material being tested with an equal volume of an aqueous solution of sodium silicate which initially contains 1.74% $Na_2O$ and 6.32% $SiO_2$ by weight. After intimate contact of the two phases, the phases are permitted to separate, and the organic phase is analyzed for water while the aqueous phase is analyzed for the organic component. The ratio of percent by weight water in the organic phase (WIO) to percent by weight organic material in the aqueous phase (OIA) is recorded as the index of bead-making ability. Organic materials having indices, determined in this manner, ranging from 2.5 to 490 have been examined. Category $a$ products can be made if this index is in excess of 25, while category $b$ products can be made if this index is in excess of 20. Indices of less than 15 produce gels throughout both phases.

TABLE II

| Organic Material | Ratio of WIO to OIA | Beads Made a : b | |
|---|---|---|---|
| n-Hexylamine | >490 | Yes | Yes |
| 2-Ethylhexylamine | >220 | Yes | Yes |
| 2-Methyl-5-ethylpyridine | >190 | Yes | Yes |
| n-Hexyl Carbitol | 32.8 | Yes | Yes |
| Alkyl Pyridine HB | 26.8 | Yes | Yes |
| n-Hexyl Cellosolve | 22.4 | No | Yes |
| 2-Methyl-1-pentanol | 14.6 | No | No |
| 1-Hexanol | 13.6 | No | No |
| 2-Ethylbutanol | 10.4 | No | No |
| n-Butanol | 2.5 | No | No |

The effect of temperature on the aforementioned bead-making indices is not known; that is to say, it is not known whether or not the effect of reaction temperature on silicic acid polymerization would change the index criteria. It can be stated, however, that if the same or approximately the same ratios of WIO to OIA prevailed when the polymerization reaction was effected at an elevated temperature, e.g., up to 60° or 70° C. or higher, then the invention would be operative at such reaction temperature with solvents such as those shown in Table II to have bead-making capability, and their equivalents. Such applications, of course, would necessarily be within the limits set by boiling point, freezing point and/or other such characteristic of the individual solvent.

It is to be understood that the data shown in Table II with respect to the specified liquid organic compounds, indices of their bead-making ability and product categories of beads that are obtainable refer to, and are the result of, solubility association relationships which exist at or near room temperature (20°–30° C., more particularly about 25° C.); and that it is fully anticipated that a change in the reaction temperature (e.g., from above room or ambient temperature to about or immediately below the boiling point of the reaction mix at the prevailing pressure) may establish suitable solubility association relationships with other similar organic compounds to produce siliceous materials of either category $a$ and/or category $b$.

Illustrative of such other organic compounds that may be useful at higher operating temperatures are the various polyethylene oxides, e.g., the various polyethers of the higher alkylphenols including those of nonylphenols and dodecylphenols containing from 4 to 13 moles of ethylene oxide per molecule; and, more particularly, Tergitol NPX which is understood to be a polyether of nonylphenol containing an average of about 10.5 —$CH_2CH_2O$—groups. Tergitol NPX and similar polyethers of nonylphenol are completely miscible in water at room temperature. They do not form a second liquid phase (principally organic) until a certain elevated temperature is reached, which is 60°–65° C. in the case of Tergitol NPX. Hence it is contemplated within the broad scope of this invention that the solubility properties inherent in such organic materials, as well as others, could make them useful in practicing the instant invention above ambient temperature, which latter is the preferred temperature for use with the operative liquid organic materials identified in Table II.

The aforementioned category $a$ products include spherical and nearly spherical granular particles that have been formed in suspension and which maintain their shape throughout further treatment. The silica beads of category $a$ of my aforementioned copending application Ser. No. 587,647 are likewise examples of the category $a$ silica particles that are obtained in practicing the present invention.

Category $a$ products are obtained in accordance with the present invention using such liquid organic compounds or reaction media as, for example, one or more of the five materials shown in Table II as making possible the formation of category $a$ beads, using proportions of system components and pH conditions such as will render silica polymerization very rapid. It is also a requirement in the production of only category *a* products that there be sufficient silicic acid present in the organic phase to mechanically (i.e., physically) maintain the shape of the dispersed droplet upon polymerization. These siliceous products are characterized, in general, by low mean pore diameters of about 20–40 A. and high surface areas (BET) of the order of 500 to 1,000 square meters per gram.

Category *b* products include finely divided materials resulting from the coagulation of the separate organic phase into a single organic gel phase. This coagulation may occur either when agitation is stopped or when the product is filtered from the reaction mass.

Category *b* products include those made utilizing such organic compounds as, for instance, one or more of the five materials shown in Table II as providing, when used, the category *a* products; and, in addition, n-hexyl Cellosolve. In this case, however, the proportions of system components and pH conditions are such as will render silica polymerization less rapid than in the production of the aforementioned category *a* products. The siliceous products of category *b* are generally characterized by being irregularly shaped particles or agglomerates thereof. The fundamental particles in the category *b* products are usually 10 microns or less in size. The silicas of this category have higher mean pore diameters and lower surface areas than those of category *a*. In contrast to the category *a* products, their mean pore diameters generally range from about 70 to about 350 A. while their surface areas (BET) are, in general, within the range of from about 300 to about 600 square meters per gram.

GENERAL PROCEDURE

The following is typical of the general procedure employed in producing siliceous materials in accordance with this invention:

The required amounts of (a) the source of water-soluble silicate, e.g., sodium silicate, (b) distilled or deionized water and (c) source of the organic phase, e.g., n-hexylamine, 2-ethylhexylamine, n-hexyl Carbitol or n-hexyl Cellosolve, are thoroughly mixed together at, for instance, ambient temperature in a reaction vessel provided with agitating means. To the resulting admixture is added a suitable acid such as a dilute (e.g., about 10 percent) aqueous solution of $H_2SO_4$ sufficient to provide a pH of from 4.5 to 10 determined as previously has been briefly described.

With further reference to the method of measuring pH, it may be stated that in some cases it was measured by the use of paper, e.g., when a continuous check over a range of pH values was desired. In other cases, a specific color indicator was employed. Brands of color indicator paper commonly employed in laboratory work include a "pHydrion" (Microessential Laboratories, Brooklyn, New York) and "Alkacid" acid test ribbons (Fisher Scientific Company, Pittsburgh, Penna.). The latter was used in the investigations leading to the present invention. Specific color indicators employed include phenol red, phenolphthalein, brom thymol blue and cresol red.

It has been found that paper measurements of pH are much more reproducible when used in the system involved in this invention than are potentiometric readings; and, furthermore, there is a trend relating the values determined by the two methods. However, it would be unreasonable to assume that in every bead batch the electrodes are similarly coated and that the extent of measurement error is constant. For this reason one cannot define pH conditions by specifying a particular meter pH value corresponding to a particular pH paper value. It can be stated, however, that in carrying the instant invention into effect the beads are produced in an overall range, using pH paper, of from 4.5 to 10; and, more particularly, in a potentiometer pH range of from 6.5 to 9.5 and a paper pH range of from 5 to 8 for category *a* product.

The rate of the acid addition is only important in relation to the rate of polymerization. In other words, as one approaches the pH range of 5–8 from the basic side, polymerization becomes more rapid as the pH is lowered. Hence the rate of acid addition only becomes important as the addition time approaches the reaction time at the finally desired pH. An obvious limitation on the rate of addition is the mechanical limitation of maintaining a uniform reaction mix, and by which is meant specifically the avoidance of local high concentrations of acid.

Concerning the order of the addition of the acid, it may be mentioned that as one approaches neutrality from the basic side, the acid should be added either later than or simultaneously with the other reactants. Such "simultaneous" addition refers to the procedure wherein the silica polymerization to form particles is carried out in a continuous reaction utilizing, for example, a series of one or more so-called "stirred tank reactors."

If not already sufficiently dilute as purchased, the sodium silicate solution should be diluted, prior to adding it to the reaction vessel, with sufficient water so that the dehydrating power of the organic material does not produce a supersaturated "silicate" solution and thereby produce an undesirable gel.

A suitable grade of commercial sodium silicate (which, however, should be diluted with water before use, if approach to the desired pH is from the basic side, for the reasons stated in the preceding paragraph) is a 40°–42° Baume solution which generally contains, by weight, from 8 to 9% $Na_2O$ and from 26 to 30% $SiO_2$, the remainder being water. The $SiO_2:Na_2$ ratio in such a sodium silicate solution, and which has generally been used in the present investigations, is about 3.3:1.

Agitation of the reaction mixture must be sufficient to disperse and maintain the dispersion of the organic phase that is present.

The temperature of mixing is preferably the ambient temperature, but the use of certain organic solvents may make it desirable or even necessary to carry out the mixing under heat at temperatures up to approximately, or immediately below, the boiling point of the mixture at the prevailing pressure, e.g., at from about 40° or 45° C. to 90° or 95° C. or even 99° C.

Within a period (e.g., from 1 minute to 1 hour or more) after the acid solution has been added, the silica polymerization product forms. The silica product in bead or other particle form is then separated from the reaction mix, e.g., by filtration. The isolated solid product may next be washed in a conventional way, e.g., with normal or hot water, to remove residual sodium salt; or it may be washed after a subsequent ignition step. The washed or unwashed siliceous product is then subjected to heat and/or vacuum to remove water and the volatile organic material. The substantially water- and organic-free siliceous material may then be ignited, e.g., at from about 400° C. to a temperature just below the sintering temperature of the silica, to remove the last traces of volatile material. The ignited silica product is then washed to remove residual sodium salt if this was not previously done. It is to be understood, of course, that the extent to which any of these product treatment steps is continued will depend, for example, upon the intended use of the product.

The ranges of the proportions, and hence the ratios, of the different components and the temperatures required to produce a desired product will vary with the particular organic phase that is employed. These conditions are best determined, as will be readily understood, by those skilled in the art, by limited experimentation with the particular liquid organic components in question.

The determination of proper conditions to produce a desired bead product with organic components other than those specifically cited is a matter of matching silica polymerization rate with interphase solubility properties as well as degree of agitation and interphase density relationships. Since all of the variables involved have effects that are necessarily interdependent, the predicted effect of any one variable must take into account the context in which it operates. An attempt will be made to describe the general effects of the variables involved and what is observed experimentally as the particle-making, specifically bead-making, range is approached.

The variables involved include the size of the silicic acid molecule at the start of the reaction, pH, silica concentration, temperature and salt concentration. The latter variable provides a means of explaining the performance of the system using sodium silicate of varying $SiO_2$:$Na_2O$ ratios. The $Na_2O$ must be neutralized with acid, of course, in order to approach a neutral pH and, therefore, the effect of having a different $SiO_2$:$Na_2$ ratio is to have more or less "salt" present at the final conditions of reaction.

The first-named variable in the preceding paragraph, viz., the size of the silicic acid molecule at the start of the reaction, may possibly be due to variations in the $SiO_2$:$Na_2O$ ratios. The effect of this particular variable cannot presently be stated with certainty. However, within the realm of ratios of $SiO_2$:$Na_2$ in the sodium silicates that are commercially available at this time, the variation in size of the starting silicic acid molecule is not expected to be very large with respect to the final molecular size of the polymerized silicic acid.

The rate of polymerization increases as the pH is lowered to a probable maximum rate between pH 5 and 6. Hence, runs made at lower pH values tend to yield category $a$ products while those made at higher pH values tend to yield category $b$ products. The effect of silica concentration on the rate of silica polymerization is not nearly so well-defined. It has been suggested (cf., Iler, supra, page 28) that, on the basic side, the rate of salt-induced polymerization is ". . . inversely proportional to the square root of the silicate concentration." In the course of the investigation leading to the present invention it has been observed that as the $SiO_2$ concentration is increased, at a constant pH, the product tends toward a category $b$ product, and this fact would seem to be in agreement with Iler's comment.

Although the effect of temperature variations has not been thoroughly investigated, it is quite likely that the effect of increased temperature would be to increase the polymerization rate, i.e., tending to produce category $a$ products at higher pH.

If the silicic acid polymerization rate is too slow, or if there is insufficient organic phase present to contain all of the silicic acid, or if the organic compound is too soluble in the aqueous phase, polymerization is experienced in both the organic and the aqueous phases. If too large a quantity of the organic phase is used (when interphase solubility properties are correct) so that silicic acid concentration in the organic phase is low, polymerization will be slowed, and setting of the dispersed bead shapes will take an extended period of time if it occurs at all.

The rate of agitation of the reaction mix, as well as the interphase density and viscosity relationships, affect the size of the dispersed phase (organic phase) droplets and, therefore, the size of the resulting bead particles. A higher degree of agitation generally produces a finer bead size. Attention is directed to the publication of Roger, Trice and Rushton, *Chemical Engineering Progress*, 52, No. 12, pp. 515–520 December, 1956), for a discussion of the effect of agitation and interphase properties on the size of dispersed phase droplets in a two-liquid phase system. One skilled in the art may then readily use the guides outlined herein to produce a bead material within the teaching of this invention with any hydrogen-bonding agents with which proper solubility relationships between it and water exist or can be made to exist by temperature effects or otherwise.

The source of the $SiO_2$ containing starting reactant that is used in practicing this invention is a water-soluble silicate, e.g., the sodium silicate known as "water-glass"; or, one may use sodium ortho-silicate or any other alkali-metal silicate embraced by the general formula $x\ R_2O^{\theta}\cdot ySiO_2$ wherein R represents an alkali metal and $x/y$ is greater than 0.24.

Although sulfuric acid is the preferred acid for inclusion in the reaction system or mix, it is not essential that only sulfuric acid be used. Other acids (both organic and inorganic) may be employed in lieu of $H_2SO_4$, e.g., hydrochloric acid, nitric acid, phosphoric acid, chlorosulfonic acid, acetic acid, di- or thichloroacetic acids, benzenesulfonic acids, and the like. In selecting the organic or inorganic acid for use in a particular system one should avoid any acid which, at the concentrations employed, reacts or tends to react with the organic component of the system.

When, for example, n-hexyl Carbitol is the organic component, the following preferred procedure, wherein all parts and percentages are by weight, unless otherwise specified, is typical of that employed in practicing this invention:

Fifty milliliters of an aqueous sodium silicate solution (6.32% $SiO_2$:1.75% $Na_2O$), 135 ml. distilled water and 20 ml. n-hexyl Carbitol are thoroughly mixed together in a reaction vessel provided with agitating means. Agitation is continued at ambient temperature (20°–30° C.) for a period sufficient to form a substantially homogeneous dispersion of the organic phase with the aqueous phase. Thirteen milliliters of 10 percent aqueous solution of $H_2SO_4$ are then added while continuing the agitation to form a reaction mixture having a pH of 8.

[Parenthetically it may here be pointed out that in practicing this invention the pH conditions affect the polymerization rate so that the time at a particular pH enroute to a final pH can affect the properties of the product. For example, if a final pH of 5 to 6 (using pH paper) is approached in a manner such that considerable time is spent at higher pH, the siliceous material obtained will tend to be that of a category $b$ product.]

Within from 0 to about 30 minutes after the addition has been completed, beads begin to appear in the reaction mix. (the reference to zero as the lower time period is made because in some cases the rate of addition of the acid may be so slow as to result in bead formation before the acid addition has been completed). At the end of the reaction period, e.g., within from about 1 to about 60 minutes or more from the achievement of the desired reaction pH level, the silica particles, e.g., in spheroidal or approximately spheroidal form, may be separated (e.g., by filtration, centrifuging, etc.) from the reaction mix, normally yielding a substantially aqueous phase. The remaining steps in the process are the same as have previously been described with reference to the general procedure.

In marked contrast to the results obtained by practicing the instant invention, a gel-like or viscous mass results if one tries to obtain silica in particle form by neutralization of sodium silicate solution in the absence of an organic solvent of the kind used in carrying the present invention into effect, e.g., n-hexyl Carbitol, n-hexyl Cellosolve and equivalent organic materials in which water is soluble in an amount sufficient to permit silicic acid to enter the globules of the organic dispersed phase and the said silicic acid can polymerize and/or continue to polymerize to assume the shape of the dispersed phase as hereinbefore has been briefly described.

From the foregoing description and that which follows, it will be seen that the present invention provides a method of producing silica particles, i.e., of the aforementioned categories $a$ and $b$, which includes the step of providing a reaction system that consists essentially of (A) a polymerizable hydrosol composed essentially of water and silica derived from an alkali-metal silicate, and (B) a liquid organic reaction medium capable of providing a dispersed phase in which the said hydrosol is soluble and wherein (i.e., within or both within and on the outer surfaces of the globules or droplets of which the said dispersed phase is constituted) it polymerizes to yield gelled particles of silica. This organic medium, which is preferably a recoverable organic medium, has an index of bead-making ability corresponding to a value of at least 20, preferably at least 25, when determined at ambient temperature as hereinbefore described. For instance, this index may be within the range of from about 22 to more than 500, e.g., 1,000, 2,000, 5,000 and higher. (To the best of my knowledge and belief there is no inoperative upper limit for this index value). The method also includes the additional step of agitating the aforesaid reaction system until gelled particles of silica have been obtained by polymerization of the said polymerizable hydrosol at a pH within the range of from 4.5 to 10 in intimate contact with the aforesaid liquid, organic, reaction medium in dispersed state.

A more specific embodiment of the invention is the method which comprises: agitating a liquid reaction mass or mixture consisting essentially of (a) water, (b) sodium silicate, (c) an acid, e.g., sulfuric acid, and (d) the aforementioned recoverable, liquid, organic, reaction medium. The kind and amount of acid that is added to the reaction mass initially or throughout all or part of the reaction period is sufficient to bring the reaction mass to a final pH within the range of from 4.5 to 10. Agitation of the initial reaction mixture or mass is continued until the organic reaction medium has been dispersed in the water, i.e., the aqueous phase, and a polymerizable hydrosol composed essentially of water and silica has been obtained. This hydrosol is soluble in the dispersed organic reaction medium and polymerizes therein. Agitation of the resulting liquid reaction mass is continued further until the polymerizable hydrosol contained therein has polymerized to form gelled particles of silica. Thereafter the gelled silica particles are isolated from the reaction mass.

The term "hydrosol," as used herein and in the appended claims, is intended to include within its meaning water and silica irrespective of the form of their association or combination since at least some of the hydrosol may be in an acid form as in, for instance, silicic acid. It is to be further understood that the term "polymerizable hydrosol composed essentially of water and silica," as used herein and in the appended claims, is not intended to exclude the amount of organic medium that is soluble in the water component of the hydrosol at the reaction temperature.

In order that those skilled in the art may better understand how the present invention can be carried into effect, the following examples are given by way of illustration and not by way of limitation. All parts and percentages are by weight unless otherwise stated. All pH indicator test papers employed were the aforementioned Alkacid acid test ribbons.

EXAMPLE 1

A 6-inch diameter vessel was fitted with four vertical 0.6-inch (i.e., 10 percent) baffles. Agitation was provided by the use of a four-bladed, turbine-type agitator, 2 inches in diameter, at approximately 1,370 rpm. To the vessel were added 950 parts of an aqueous solution of water-soluble sodium silicate composed essentially of 6.32% $SiO_2$:1.75% $Na_2O$, 2,430 parts of distilled water, and 325 parts of n-hexyl Cellosolve. To this dispersion was added 270 parts of a 10 percent aqueous solution of $H_2SO_4$. The pH was measured by means of a glass electrode system and the pH of the final mix (measured in this way) was 6.7. This is comparable, based on the experience gained in this investigation, to a pH with indicator paper of 4.5.

The acid solution was added over a 1-minute period. Agitation was continued for 20 minutes after the completion of the acid addition. The reaction mix was then filtered, and the resulting filter cake was over-dried. A category $b$ material was obtained.

EXAMPLE 2

This example differs from Example 1 mainly in that n-hexyl Carbitol instead of n-hexyl Cellosolve was used as the organic phase. The reaction proportions and the other reaction components were otherwise the same. The reaction apparatus, agitating means, pH measuring technique and order of addition of ingredients were also the same as in Example 1. The pH (glass electrode) of the final mix was slightly higher, viz., 7.1, which is comparable to a pH of 5.0 with indicator paper.

The acid solution was added over a period of less than 1 minute. Agitation was continued for a period of 16 minutes after completing the addition of the acid. The product was recovered by filtration, and was given five washes with 4,500 parts of water each, followed by oven-drying after the final wash. It was a category $a$ type of material, and maintained its granular nature even after completion of the aforementioned washes.

EXAMPLE 3

This example illustrates conditions under which n-hexyl Carbitol yields a category $b$ type of product.

This example illustrates conditions under which n-hexyl Carbitol yields a category $b$ type of product.

The reaction vessel, agitating means, pH measuring technique and order of addition of ingredients were the same as in Examples 1 and 2. The reaction mix proportions were also the same as in Example 2 with the exception that only 252 parts of a 10 percent aqueous solution of sulfuric acid was used, and the pH (glass electrode) of the final mix was 9.0. This is comparable to a pH of 7.6 with indicator paper. The acid solution was added over a period of 3 minutes. Agitation was continued for 45 minutes after all the acid had been added. Thereafter agitation was discontinued, and the reaction mix was filtered. The resulting filter cake was dried, yielding a category $b$ product.

EXAMPLE 4

This example illustrates conditions under which n-hexyl Carbitol yields a category $a$ product under intermediate pH conditions.

Exactly the same as in Example 3 with the exception that 254 parts (instead of 252 parts as in Example 3) of a 10 percent aqueous solution of $H_2SO_4$ was added to the reaction mix, and the pH (glass electrode) of the final mix was 8.5 instead of 9.0. This pH of 8.5 is comparable to a pH of 6.8 with indicator paper. A category $a$ product in the form of spherical particles was produced.

EXAMPLE 5

This example illustrates the effect of silica concentration on the type of product that is obtained.

The liquid organic reaction medium was the same, viz., n-hexyl Carbitol, in all three runs that were made. The procedure was the same as in the prior examples but using the following proportions of ingredients:

| | A | B | C |
|---|---|---|---|
| Aqueous solution of sodium silicate | 533 | 800 | 1066 |
| Distilled water | 1330 | 1100 | 850 |
| n-Hexyl Carbitol (org.) | 178 | 178 | 266 |
| Aqueous 10% $H_2SO_4$ | 140 | 223 | 291 |
| pH (glass electrode) | 8.5 | 8.5 | 8.5 |
| mg. $SiO_2$/ml. org. | 153 | 229 | 203 |
| mg. $SiO_2$/g. $H_2O$ | 16.5 | 24.9 | 33.2 |
| Product category | a) | a) | b) |

The runs of A, B and C had equal mix volumes.

In commenting upon the significance of the results of the foregoing runs, it may first be mentioned that (a) it is difficult to separate the effect of individual variables in reactions of this type and (b) the conventional way of achieving greater aqueous phase $SiO_2$ content is to increase the amount of sodium silicate added to the system whereby the $Na_2O$ content is increased as is also the amount of acid required for neutralization.

The significant observation to be noted in the foregoing results is the category of product obtained at different ratios of $SiO_2$/organic feed and of $SiO_2$/$H_2O$ feed. The ratio of $SiO_2$ to feed organic material for Run C was between that of Runs A and B, while the ratio of $SiO_2$ to feed water was highest in Run C. Run C yield a category $b$ product while category $a$ products were obtained from each of Runs A and B.

EXAMPLE 6

The prior examples illustrate the results obtained when the agitation is constant; that is, in all runs the agitator was operated at a speed of 1,370 rpm. This example illustrates how the category of the product is altered when the speed of the agitator is varied.

|  | D | E |
|---|---|---|
| Aqueous sodium silicate | 1066 | 1066 |
| Distilled water | 850 | 850 |
| n-Hexyl Carbitol (org.) | 266 | 266 |
| Aqueous 10% $H_2SO_4$ | 295 | 295 |
| pH (glass electrode) | 8.0 | 8.0 |
| mg. $SiO_2$/ml. org. | 203 | 203 |
| mg. $SiO_2$/g. $H_2O$ | 33.2 | 33.2 |
| Agitator speed, rpm | 1370 | 2100 |
| Product category | b) | a) |

EXAMPLE 7

This example illustrates the effect of the order of the addition of the ingredients on the category of the product that is obtained.

Run D of Example 6 was carried out using an order of charging the components of the reaction mix to the reactor normally used in this investigation; that is, the acid was added to the aqueous sodium silicate solution thereby to approach approximate neutrality from the basic side.

If the above-described procedure be reversed with the order of addition being (1) water, aqueous $H_2SO_4$ and n-hexyl Carbitol, in any order, and (2) finally the aqueous sodium silicate solution, approximately neutral pH is approached from the acidic side.

A run identical to Run D in mix proportions, vessel configuration and agitator speed, designated as Run F, was made in this manner. The resulting particulate silica, unlike that of Run D, also was a category a product. The reason for this is not clearly understood. However, it is speculated that it is because the final pH of the mix was approached under conditions that caused more rapid polymerization of the silica.

EXAMPLE 8

This example illustrates the results obtained when an attempt is made to produce silica beads in the absence of the liquid organic component.

A run was made that was identical in all respects to that of Example 1 with the exception that no organic material was included in the formulation. The batch remained clear for 50 minutes after completing the acid addition, and then began to become cloudy. The mix proceeded to become successively more viscous. Agitation was continued for a total of 380 minutes at the end of which period of time the mix was still somewhat fluid. After standing for 18 hours the mix was still semi-fluid with a viscosity of 0.75 stoke (by Gardner bubble viscometer).

EXAMPLE 9

This example differs from Example 1 mainly in that Tergitol NPX was substituted for n-hexyl Cellosolve, and the silica bead-forming reaction was effected at an elevated temperature, more particularly at about 76° C.

The reaction vessel and agitating technique were similar to that employed in Example 1. To the vessel were added the following ingredients in the specified proportions:

950  parts of an aqueous solution of water-soluble sodium
         silicate composed essentially of 6.32% $SiO_2$:1.75%
         $Na_2O$
    2430 parts of distilled water
    325  parts of Tergitol NPX The mix was then heated to 76° C. over a period of 30 minutes. Tergitol NPX is completely miscible with the other two components of the reaction mixture at ambient temperature in the aforementioned proportions but the mix begins to cloud at 50° C., signaling the formation of a dispersed phase.

Two hundred and eighty-four parts of a 10 percent aqueous solution of $H_2SO_4$ was then added, and the pH was between 4.5 and 5 (measured by means of an Alkacid pH test ribbon). Beads formed immediately upon addition of the acid. Agitation was continued for 10 minutes after all the acid had been added. The reaction mix was filtered to isolate the product in the form of a filter cake, which was oven-dried and ignited (calcined) at about 500° C. to remove the organic material. The ignited silica particles constituted a category b product.

EXAMPLE 10

This example illustrates the use of n-hexylamine as the liquid organic component of the reaction system.

A 100 ml. beaker, agitated by means of a magnet on a magnetic stirring plate, was used in this run which was made at room temperature. 17.8 parts of an aqueous solution of water-soluble sodium silicate composed essentially of 6.32% $SiO_2$:1.75 $na_2O$ was added to 45 parts distilled water. 2.3 parts of n-hexylamine was added to this solution, resulting in the dispersion of the organic phase. To this dispersion was added 5.9 parts of a 10 percent aqueous solution of $H_2SO_4$, which was added dropwise over a period of about 1 minute. The resulting pH was 9.5 as measured by test paper.

Upon completion of the acid addition, solids were already suspended in the mix. Agitation was continued for 43 minutes at which time the mix was filtered and a product cake recovered. This filter cake was oven-dried and ignited. It proved to be a category a product, i.e., very finely divided spheroidal shapes.

EXAMPLE 11

This example illustrates the use of 2-methyl-5-ethylpyridine as the liquid organic reaction medium.

The equipment and procedure were similar to that employed in Example 10. 17.8 parts of an aqueous solution of water-soluble sodium silicate composed essentially of 6.32% $SiO_2$:1.75 $na_2O$ was added to 45 parts distilled water. 1.8 parts of 2-methyl-5-ethylpyridine was then added to this solution, whereupon the organic phase was dispersed. To this dispersion was added 5.1 parts of a 10 percent aqueous solution of $H_2SO_4$. This acid solution was added dropwise over about a 1-minute period. The resulting pH as measured by test paper was slightly less than 7.0, i.e., between 6.5 and 7.0.

Upon completion of the acid addition, solids were already suspended in the mix. Agitation was continued for 51 minutes, after which the product was isolated by filtration, oven-dried and calcined as in Example 10 to yield a category a product.

EXAMPLE 12

This example illustrates the use of an organic compound that is inoperative as a liquid reaction medium in practicing the present invention, viz., n-butanol.

The apparatus and procedure were similar to that employed in Example 10, and the composition of the aqueous solution of sodium silicate as initially prepared was the same as in that example. To this initial solution of sodium silicate in distilled water was added 5.4 parts of n-butanol. To this dispersion was added 4.5 parts of a 10 percent aqueous solution of $H_2SO_4$, which was added dropwise in three approximately equal portions at evenly spaced intervals within a 9-minute period. The pH of the resulting solution, as measured by means of glass electrodes, was 7.0. This would generally correspond to a pH of 5 as measured with test paper.

Within 15 minutes after the addition of the acid had been completed, the reaction mix began to gel in both phases. These results show the contrast between n-butanol and those organic materials that are operative in forming beads and wherein gelling occurs in the organic phase only.

EXAMPLE 13

This example illustrates the recovery of the volatile organic reaction medium from the isolated beads.

A bead product similar to that obtained from Example 1, with the exception that the beads had been water-washed after filtration to remove the sodium salts, was subjected to heat at reduced pressure in order to recover the n-hexyl Cellosolve used as the liquid organic component of the reaction mix. The majority of the organic component was recovered at 105° C. and under 0.5 mm. Hg pressure absolute.

From the foregoing description of this invention including the illustrative examples it will be seen that the reaction system is complex, especially with regard to the type of particulate silica product that is obtained. With reference to the various influencing factors involved, the following additional comments and summary may be made.

For any particular temperature and operative organic liquid reaction medium employed, the significant variables in obtaining a particular category of product include:
  a. The final pH of the mix.
  b. The route to achieve this final pH.
  c. The concentration of $SiO_2$ in the mix both with respect to the organic phase and to the aqueous phase that are present.
  d. The manner and rate of agitation.
  e. The residence time of the reaction mix in the reactor.

With regard to the foregoing variables and their effect in producing a category $a$ or a category $b$ product, the following generalized statements may be made:
  1. Overall, those variables in the foregoing list that increase the rate of silicic acid polymerization tend to produce a category $a$ product while those that slow the rate of polymerization tend to provide a category $b$ product.
  2. Higher pH (closer to 10.5 than to 4.5), higher silica concentration in the aqueous phase, a lower degree of agitation and a shorter residence time in the reactor tend to produce a category $b$ product.
  3. Lower pH, lower silica concentration in the aqueous phase, a higher degree of agitation and a longer residence time in the reactor tend to provide a category $a$ product.

Among the advantages of the present invention is the fact that the applicant's discovery extends the field of organic materials that can be used in the production of silica particles to those that can be recovered by simple distillation technique and thus provides important and material economic advantages in the manufacture of particles, especially beads or bead-like particles comprised or composed of silica, for catalytic and other applications. In conventional prior art processes wherein a typical organic surfactant has been employed, e.g., Tergitol NPX, such surfactants must be removed from the silica particles by oxidation if the particles are to be used in catalytic and most other applications. When this is done, economical recovery, e.g., by distillation, of organic compounds heretofore used or suggested for use is precluded.

Other advantages attained by practicing the present invention are that a substantial excess of acid is neither required nor desired. Likewise a setting (hardening) agent is not necessary, nor is a separate emulsifier needed. Another advantage is that, with the preferred organic reaction media, the reaction can be effected at ambient temperature (20°–30° C.).

Unlike the embodiment of the invention disclosed in my aforementioned copending application wherein the reaction mass is acidic and a substantial amount of a salting-out agent is used to achieve desired solubility properties when certain solvents are employed, no such agent may be used to a similar extent in practicing this invention. This is because the presence of salt will affect markedly the silicic acid polymerization rate under basic or close to basic pH conditions, thereby considerably altering and possibly eliminating the normal bead-forming mechanism. This fact limits or tends to limit the class and species of organic solvents that can be employed in this type of silica polymerization system.

As indicated hereinbefore, one of the most important and valuable advantages of the instant invention accruing from the use of a volatile (volatilizable), liquid, organic, reaction medium of the kind exemplified by n-hexylamine, 2-ethylhexyl- amine, n-hexyl Cellosolve, n-hexyl Carbitol, 2-methyl-5-ethyl-pyridine, and Alkyl Pyridine HB is the fact that they are readily recoverable (e.g., by distillation) from the reaction mass in which the gelled particles of silica have been formed. The economic benefits attained by thereby lowering operating costs when the liquid, organic, reaction medium is recovered will be fully appreciated by those skilled in the art.

Accordingly, the method features of the present invention optionally, but most advantageously, include the additional step or steps of recovering this liquid organic component from the reaction mass at the end of the reaction period. Thus, in addition to the broad or primary steps heretofore described, the liquid organic component may be recovered by means such as described, for instance, in Example 13.

From observations made during the course of this investigation it appears that substantially all the organic liquid that is insoluble in the aqueous medium accompanies and is rather strongly held by the gelled silica particles. Hence, after the gelled silica particles have been separated from at least the main portion of the aqueous phase, e.g., by filtering, centrifuging, siphoning, decanting and the like, the organic medium can be recovered from the resulting mass by changes in temperature and/or pressure (i.e., distillation), by extraction with a selective solvent, or by any other suitable means. If economically advantageous, the dissolved organic medium in the aqueous phase can be similarly recovered.

After the silica particles have been treated to recover the organic medium used in the process, they are ignited (calcined) at an elevated temperature, e.g., about 500° C., whereby volatile material including any remaining organic substance is eliminated. Washing of the gelled particles, e.g., with water, to remove soluble contaminants, for instance salts, can be carried out either before or after treating the silica particles to recover the organic reaction medium; or before or after the ignition step if the aforesaid recovery step has not been carried out.

In some cases, e.g., when the organic solvent is relatively low boiling (i.e., below the boiling point of water), it may be economically advantageous to also recover the organic solvent from the water washings. Or, if the organic solvent is very expensive, in such cases it may be economically desirable to recover the said solvent from the washings by evaporating off the wash fluid, leaving the organic solvent as a residue.

The gelled silica particles referred to hereinbefore and in the appended claims are visualized as being composed of a matrix of silica polymer with liquid, including both organic liquid (i.e., organic reaction medium) and water or aqueous solution, occupying or filling holes or voids in the silica polymer matrix. Within this concept they might properly be considered to be silica organogels, and/or hydrogels and/or organo-hydrogels with the probability that the said particles are predominantly silica organogels.

As will be understood by those skilled in the art, modifications of this invention can be made or followed without departing from the spirit and scope of the foregoing disclosure or from the scope of the appended claims.

What is claimed is:
1. The process of producing silica particles which includes the step of
  I. providing a reaction system having an aqueous phase and consisting essentially of
    A. a polymerizable hydrosol composed essentially of water and silica derived from an alkali-metal silicate, and
    B. a liquid, organic, reaction medium capable of providing a dispersed organic phase in which said hydrosol is soluble and wherein it can polymerize to yield gelled particles of silica, the ratio of percent by weight water in the organic phase to the percent by weight organic medium in the aqueous phase corresponding to a value of at least 20 when determined at ambient temperature; and

II. agitating said reaction system at a silica polymerization temperature until gelled particles of silica have been obtained by polymerization of said polymerizable hydrosol at a hydrosol pH within the range of 4.5 to 10, said polymerization being within said dispersed phase of liquid, organic reaction medium.

2. The method as in claim 1 wherein said ratio corresponds to a value of at least 25 when determined at ambient temperature.

3. The method as in claim 1 wherein the reaction system is an ambient temperature.

4. The method as in claim 1 wherein the alkali-metal silicate specified in A is sodium silicate.

5. The method as in claim 1 wherein the alkali-metal silicate specified in A is sodium silicate, and the organic reaction medium of B comprises an alkylpyridine.

6. The method as in claim 5 wherein the alkylpyridine is 2-methyl-5-ethylpyridine.

7. The method as in claim 1 wherein the alkali-metal silicate specified in A is sodium silicate, and the organic reaction medium of B comprises n-hexylamine.

8. The method as in claim 1 wherein the alkali-metal silicate specified in A is sodium silicate, and the organic reaction medium of B comprises 2-ethylhexylamine.

9. The method as in claim 1 wherein the alkali-metal silicate specified in A is sodium silicate, and the organic reaction medium of B comprises ethylene glycol mono-n-hexyl ether.

10. The method as in claim 1 wherein the alkali-metal silicate specified in A is sodium silicate, and the organic reaction medium of B comprises diethylene glycol mono-n-hexyl ether.

11. The method as in claim 1 wherein the alkali-metal silicate specified in A is sodium silicate, the liquid organic reaction medium of B is a volatile liquid organic reaction medium, and the agitating step of II is carried out at ambient temperature until gelled particles of silica have been obtained.

12. The method as in claim 11 which includes the additional steps of isolating the gelled particles of silica from the reaction mass; and recovering the volatile liquid organic reaction medium of B.

13. The method as in claim 1 wherein the alkali-metal silicate specified in A is sodium silicate; and the reaction system is brought to a final pH within the range of from 4.5 to 10 by addition of a dilute aqueous solution of sulfuric acid to the reaction mass initially or as the reaction proceeds.

14. The process of producing silica particles which comprises:
  A. agitating a liquid reaction mass having an aqueous phase and consisting essentially of
    a. water,
    b. sodium silicate,
    c. an acid, and
    d. a recoverable, liquid, organic, reaction medium capable of providing a dispersed aqueous phase in which a polymerizable hydrosol composed essentially of water and silica is soluble and wherein it can continue to polymerize to yield gelled particles of silica, the kind and amount of acid that is added to the reaction mass initially or throughout all or part of the reaction period being sufficient to bring the reaction mass to a final pH within the range of 4.5 to 10; the ratio of percent by weight water in the organic phase to the percent by weight organic medium in the aqueous phase corresponding to a value of at least 20 and which is determined at ambient temperature;
  B. continuing to agitate the liquid reaction mass of A until the organic reaction medium of (d) has been dispersed in the water of (a) and a polymerizable hydrosol composed essentially of water and silica has been obtained, said hydrosol being soluble in said dispersed organic reaction medium and polymerizing therein;
  C. continuing to agitate the liquid reaction mass of B until the polymerizable hydrosol contained therein has polymerized to form gelled particles of silica; and
  D. isolating the gelled particles of silica from the reaction mass of C.

15. The method as in claim 14 wherein said ratio is at least 25; the acid of (c) is an aqueous solution of sulfuric acid; and the liquid reaction mass is agitated for from 1 to about 60 minutes after completing the addition of all the aqueous solution of sulfuric acid to the said mass.

16. The method as in claim 15 wherein the liquid reaction mass is agitated at ambient temperature.

* * * * *